(12) United States Patent
Bretthauer et al.

(10) Patent No.: US 7,545,572 B2
(45) Date of Patent: Jun. 9, 2009

(54) PROJECTION OBJECTIVE WITH FIXED FOCAL LENGTH FORMED OF SEVERAL SUBASSEMBLIES FOR DIGITAL PROJECTION

(75) Inventors: Bernward Bretthauer, Göttingen (DE); Horst Linge, Kaufungen (DE); Jens Muller, Moringen (DE)

(73) Assignee: Jos. Schneider Optische Werke GmbH (DE)

( * ) Notice: Subject to any disclaimer, the term of this patent is extended or adjusted under 35 U.S.C. 154(b) by 77 days.

(21) Appl. No.: 11/820,868

(22) Filed: Jun. 21, 2007

(65) Prior Publication Data

US 2008/0013193 A1    Jan. 17, 2008

(30) Foreign Application Priority Data

Jun. 22, 2006    (EP)    ................... 06012834

(51) Int. Cl.
*G02B 9/00* (2006.01)
(52) U.S. Cl. .................. 359/649; 359/754; 359/821
(58) Field of Classification Search ......... 359/649–651, 359/694–706, 754, 821, 826, 827; 353/119, 353/122
See application file for complete search history.

(56) References Cited

U.S. PATENT DOCUMENTS

| 4,472,031 | A | * | 9/1984 | Muryoi | ....................... 359/704 |
| 6,382,799 | B1 | | 5/2002 | Nishikawa et al. | |
| 6,429,980 | B1 | * | 8/2002 | Ishikawa | ..................... 359/704 |

FOREIGN PATENT DOCUMENTS

| EP | 1024395 A2 | 8/2000 |
| JP | 62-102216 | 5/1987 |
| JP | 8-327870 | 12/1996 |
| JP | 2000-171702 | 6/2000 |
| JP | 2000-214367 | 8/2000 |
| JP | 2003-337272 | 11/2003 |
| JP | 2006-85091 | 3/2006 |

OTHER PUBLICATIONS

Yoder, "XP-002409351 "Mounting Optics in Optical Instruments"," (pp. 117-121), (2002).
Linos, "Linos XP-002430577," Catalog 2003, (p. L14), (2003).
Hitachi Ltd., "English Language Translation of Abstract of Japanese Patent Document 62-102216," (1 pg.), (May 12, 1987).
Nikon Corp., "English Language Translation of Abstract of Japanese Patent Document 8-327870," (1 pg.), (Dec. 13, 1996).
Sony Corp., "English Language Translation of Abstract of Japanese Patent Document 2000-171702," (1 pg.), (Jun. 23, 2000).
Olympus Optical Co. Ltd., "English Language Translation of Abstract of Japanese Patent Document 2000-214367," (1 pg.), (Aug. 4, 2000).
Nikon Corp., "English Language Translation of Abstract of Japanese Patent Document 2003-337272," (1 pg.), (Nov. 28, 2003).
Nitto Kogaku KK, "English Language Translation of Abstract of Japanese Patent Document 2006-85091," (1 pg.), (Mar. 30, 2006).

* cited by examiner

*Primary Examiner*—Darryl J Collins
(74) *Attorney, Agent, or Firm*—Price, Heneveld, Cooper, DeWitt & Litton, LLP

(57) ABSTRACT

The invention relates to a projection objective with fixed focal length for digital projection, characterized by the following features:
a first optical subassembly of several lenses seated in a first objective housing;
a second optical subassembly of several lenses seated in a second objective housing; and
a third objective housing that, in the region of one end, accepts the first objective housing, and in the region of the other end, accepts the second objective housing.
Such an objective is designed to be structurally simple and makes possible a simple and precise assembly.

29 Claims, 1 Drawing Sheet

PROJECTION OBJECTIVE WITH FIXED FOCAL LENGTH FORMED OF SEVERAL SUBASSEMBLIES FOR DIGITAL PROJECTION

CLAIM OF PRIORITY

Applicant hereby claims the priority benefits under the provisions of 35 U.S.C. § 119, basing said claim of priority on European Patent Application Serial No. 06 012 834.5, filed Jun. 22, 2006. In accordance with the provisions of 35 U.S.C. § 119 and Rule 55(b), a certified copy of the above-listed European patent application will be filed before grant of a patent.

BACKGROUND OF THE INVENTION

The invention relates to a projection objective with fixed focal length for digital projection, in particular for digital cinema. The projection objective finds application, for example, as the base objective with an anamorphic attachment.

Projectors used in digital cinema are characterized by a beam-splitter prism between the chips and the objective. The glass path length is up to 119.5 mm, whereby a longitudinal chromatic aberration and an aperture aberration arise.

Mainly, zoom objectives are offered on the market. However, for fixed installations, a zoom objective is not necessary. Moreover, the conversion of the chip format to the image format 2.35:1 advantageously takes place in digital cinema with the aid of an anamorphic attachment. In order to reduce the dimensions of the attachment and thus the costs, it is necessary that the screen side aperture diaphragm not be too far away from the front lens. This goal is difficult to achieve with zoom objectives.

Described in DE 103 53 563 B4 is a projection objective with fixed focal length for digital projection that displays nine lenses. This fulfills the above-mentioned requirements. However, in all of the specified embodiment forms, this objective contains an aspherical surface, which increases the production costs.

As will be appreciated by those skilled in the art, the present invention is directed to the physical consideration or aspects of the projection objective. Data concerning its structural design are not to be obtained from the present disclosure.

In order to realize an optimal reproduction quality with a projection objective, it is necessary to center the lenses most accurately in reference to the optical axis of the projection objective. Here an accuracy of centering of less than $\frac{1}{1000}$ mm must be assured. Only then can an outstanding brilliance be achieved.

SUMMARY OF THE INVENTION

The goal of the invention is to create a projection objective with fixed focal length for digital projection that is designed to be structurally simple and can be assembled simply and precisely.

The stated object of the invention is achieved through a projection objective according to the features of patent claim 1 herein, thus through a projection objective with a fixed focal length for digital projection with the following features:

a first optical subassembly of several lenses seated in a first objective housing, a second optical subassembly of several lenses seated in a second objective housing, and a third objective housing that, in the region of one end, accepts the first objective housing and, in the region of the other end, accepts the second objective housing.

In the simplest configuration, the third objective housing represents a connecting part for the first and the second objective housings. This divided structure of the projection objective makes it possible to assemble the lenses of the first optical subassembly independently of the lenses of the second optical subassembly. After the lenses of the first optical subassembly are assembled in the first objective housing and thus also centered, and the assembly of the lenses of the second subassembly, including centering, has taken place in the second objective housing, the projection objective can readily be assembled through connecting the first objective housing with the second objective housing by means of the third objective housing.

Through precise seating of the individual objective housings, the latter can be optimally aligned, that is, centered with respect to each other.

In one example of the present invention, the projection objective has a maximum of nine lenses. If the projection objective possesses nine lenses, one optical subassembly may display four lenses, and the other optical subassembly may display five lenses. Specifically, it is planned that the projection objective is configured so that the objective displays the first optical subassembly that contains four lenses (lenses 1-4) on its enlargement side, and displays the second optical subassembly that contains five lenses (lenses 5-9) on its reduction side.

Preferably, in the projection objective, the lenses are arranged in the sequence of image (enlargement side) to object (reduction and illumination side) as follows:

a first, negative lens, a second, negative lens, a third lens, a fourth, positive lens, a fifth lens, a sixth, positive lens, a seventh, negative lens, an eighth, positive lens, and a ninth, positive lens.

Arranged between the fourth and the fifth lenses is, for example, a stop.

Advantageously, two lenses of the second optical subassembly, in particular the seventh and the eighth lenses, are cemented to each other.

In addition, it is considered an advantage, especially on cost grounds, when all of the lens surfaces of the projection objective are spherical or planar.

It is also possible to seat a third optical subassembly in the third objective housing.

Concerning the centering, at least one lens and/or one cemented member should be able to be centered by centering means in relation to the optical axis of the projection objective. Preferably the majority of the lenses of the projection objective are able to be centered. A lens can be able to be centered individually. It is entirely conceivable to center several neighboring lenses in common.

The centering mechanism for the respective lenses or for the cemented member preferably exhibits at least three threaded pins that are radially directed and are screwed into threaded bores of the objective housing assigned to the respective lens or to the cemented member. These threaded pins are one example arranged at identical angular divisions.

If three threaded pins are arranged for centering, neighboring threaded pins thus include an angle of 120° with each other. In the case of four threaded pins, the angle is 90°.

The centering of neighboring lenses can, for example, be accomplished by a common centering mechanism, wherein the two lenses, in the region of the lens surfaces facing each other, are held in a mounting ring that is conically-shaped on both sides, and interact with the centering mechanism.

For a simple assembly of lenses, additional devices for the fixing of at least one lens in the direction of the optical axis are advantageously provided, which may include a stop of the objective lens housing and/or a spacer acting between the lenses and/or a ring that can be screwed into the objective housing.

Further features of the invention are described in the dependent claims, in the description of the single figure and in the figure itself, in connection with which it is noted that individual features and all combinations of individual features represent further inventive forms.

These and other advantages of the invention will be further understood and appreciated by those skilled in the art by reference to the following written specification, claims and appended drawings.

BRIEF DESCRIPTION OF THE DRAWINGS

The embodiment example is explained in detail in the following, with reference to the drawing, in which.

DETAILED DESCRIPTION OF THE PREFERRED EMBODIMENTS

Figure 1:
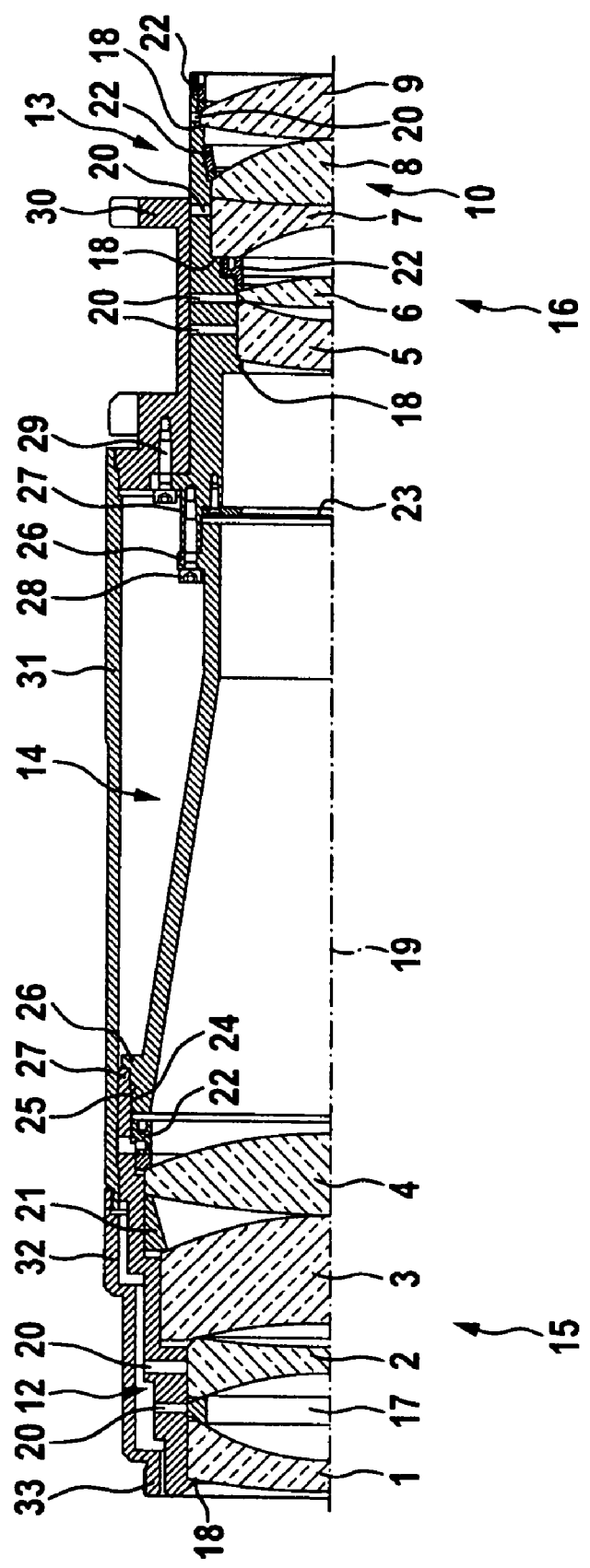
FIG. 1 is a longitudinal center cross section through the rotationally symmetrical projection objective.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown in FIG. 1 is a half of the projection objective 11 that displays or incorporates nine lenses. The projection objective is formed with the following arrangement of the lenses in the sequence from the image (enlargement side) to the object (reduction and illumination side):

a first, negative lens 1 with a convex surface on the image side and a concave surface on the object side, a second, biconcave lens 2, a third lens 3 with a concave surface on the image side and a convex surface on the object side, a fourth, biconvex lens 4, a fifth lens 5 with a convex surface on the image side and a concave surface on the object side, a sixth, biconvex lens 6, a seventh, biconcave lens 7, an eighth, biconvex lens 8, and a ninth, biconvex lens 9.

The lenses 7 and 8 are cemented together, therefore representing a cemented assembly or member 10.

The projection objective 11 displays a first objective housing 12, a second objective housing 13 and a third objective housing 14, which, in the region of its one end, accepts the first objective housing 12, and in the region of its other end, receives or accepts the second objective housing 13. Seated in the first objective housing 12 is a first optical subassembly 15 that comprises the lenses 1 to 4, and seated in the second objective housing 13 is a second optical subassembly 16 that comprises the lenses 5 to 9.

Both optical subassemblies 15 and 16 are assembled independently and are centered, after which the projection objective 11 is put together or assembled.

The assembly of the first optical subassembly 15 takes place as follows: arranged between lenses 1 and 2 is a centering ring 17 that is implemented as a mounting ring conically shaped on both sides. The two lenses 1 and 2 lie against its conical surfaces. These three parts are pushed in from the object side of the objective housing 12, and lens 1 at its image side rests against a radially inwardly directed protrusion 18 of the projection objective housing 12. The two lenses 1 and 2 and the centering ring 17 possess an identical outer dimension that is slightly smaller than the inner diameter of the objective housing 12 in this region. In this region, the objective housing 12 displays three threaded bores, which are arranged at an angle of 120° with respect to the optical axis and into which threaded pins 20 are screwed, which pins act on the centering ring 17. Through radial adjustment of the three centering pins 20, the centering ring 17 can be precisely centered with respect to the optical axis 19, specifically in the range of $1/1000$ mm, whereby the lenses 1 and 2 that are held radially in the centering ring 17 are also centered. In principle, as is suggested, independent centering pins 20 could also be assigned to lens 2, with the pins acting directly in a radial manner on the outer surfaces of this lens 2.

The lens group formed of lenses 1 and 2 is held axially fixed by lens 3, which is held in a radially outwardly shifted offset portion of the objective housing 2 and is supported with its image side on the object side of lens 2. Arranged between lens 3 and 4 is a spacing ring 21 that is supported on the object side of lens 3 and the image side of lens 4 in the radially outer region of lens 3 and lens 4. The spacing ring 21 and lens 4 are axially guided in another radially outwardly running offset portion of the objective housing 12. The object side end of the objective housing 12 is provided with an inner thread into which a ring 22 is screwed. The ring 22 that is screwed into the objective housing 12 contacts the object side of lens 4. In this way, the first optical subassembly is axially fixed. More specifically, beginning with the protrusion 18 assigned to the image side, lens 1, centering ring 12, lens 2, lens 3, spacer ring 21, lens 4, and ring 22 are axially fixed. In this subassembly, only lenses 1 and 2 are centered by means of centering pins 20.

The second optical subassembly 16 of the second objective housing 13 is also assembled from the object side of the objective housing 13. The objective housing 13 also displays at the image side a protrusion 18 directed radially inward. In the first section of the second objective housing 13, which connects at the protrusion 18, lenses 5 and 6 are arranged, wherein lens 5 at its object side directly contacts lens 6 at its image side. In each case, both lenses 5 and 6 are assigned three centering pins 20 that are arranged at a 120° angle to the optical axis to center the lenses 5 and 6. Screwed into a threaded, radially outwardly directed connecting offset portion of the objective housing 13 is a ring 22, which thus fixes lenses 5 and 6 between itself and the protrusion 18. The cemented member 10 is seated in another connecting offset portion directed radially outward in the objective housing 13, where, in the above-described manner, three centering pins 20 work together with the outer circumferential surface of lens 7 of the cemented member 10. The pins 20 penetrate threaded borings or holes in the objective housing 13. The cemented member 10 is axially fixed by another ring 22, which is screwed into the thread of an offset, located radially further out of the objective housing 13, and fixes the cemented member 10 between itself and the neighboring offset 18 in the objective housing 13. Finally, lens 9 is fixed between another offset portion 18 of the objective housing 13 and a ring 22 is screwed into the latter. Three centering pins 20 serve to center lens 9, wherein the pins are screwed into the objective housing 13, as described hereinabove.

In the region of the image side end of the objective housing 13, a stop 23, in particular an asymmetrical stop, is screwed into this region.

Both optical subassemblies 15 and 16 are individually assembled in the described manner, and the lenses, to the extent planned, are centered with reference to the optical axis 19 of the objective 11, and thus with reference to respective subassembly 15 or 16. Next, the final assembly of this objective 11 follows. Here, the third objective housing 14, which is provided with an outer thread 24 on its image side, is screwed into an inner thread 25 of the first objective housing 12 at its object side. An interlocking of objective housing 12 and objective housing 14 is brought about via a flange 26 of objective housing 14 and a web 27 of objective housing 12. In a similar or corresponding manner, the second objective housing 13 and the third objective housing 14 are connected to each other using a plug connection. Also, an interlocking connection of the housing is accomplished through a contacting of a flange 26 and an associated web 27. The connection of the objective housing 13 and the objective housing 14 takes place by several screws 28.

Furthermore, through a screw connection (screws 29), a recess 30, which facilitates connection to the projector, is connected to the second objective housing 13. Covers 31 and 32 enclose the three objective housings 12, 13 and 14, wherein the covers are overlapping. Cover 32 is arranged in the region of first optical subassembly 15, and is provided on the image side, with an outer thread 33 for connecting to an accessory part.

The objective exhibits, for example, a focal length of 57 mm with a relative aperture of 1:2.5 and an image angle: 2 w=35.1° or a focal length of 69 mm with a relative aperture of 1:2.5 and an image angle: 2 w=29.2°.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A projection objective having a fixed focal length for digital projection, comprising:
a first optical subassembly having a plurality of lenses seated in a first objective housing;
a second optical subassembly lens seated in a second objective housing;
a third objective housing having said first objective housing received in one end thereof, and said second objective housing received in an opposite end thereof; and wherein
each of said lenses has lens surfaces that are spherical or planar.

2. A projection objective as set forth in claim 1, wherein: said projection objective has a maximum of nine lenses.

3. A projection objective as set forth in claim 2, wherein: one of said first and second optical subassemblies has four lenses, and the other of said first and second optical subassemblies has five lenses.

4. A projection objective as set forth in claim 3, including: an enlargement side which includes said first optical subassembly mounted therein.

5. A projection objective as set forth in claim 4, including: a reduced side which includes said second optical subassembly mounted therein.

6. A projection objective as set forth in claim 5, including:
a first, negative lens;
a second, negative lens;
a third lens;
a fourth, positive lens;
a fifth lens;
a sixth, positive lens;
a seventh, negative lens;
an eighth, positive lens; and
a ninth, positive lens.

7. A projection objective as set forth in claim 6, including: a stop positioned between said fourth lens and said fifth lens.

8. A projection objective as set forth in claim 7, wherein: said seventh lens and said eighth lens are cemented together.

9. A projection objective as set forth in claim 8, wherein: each of said lenses has lens surfaces that are spherical or planar.

10. A projection objective as set forth in claim 1, wherein: said projection objective includes first, second, third, fourth, fifth, sixth, seventh, eighth, ninth and tenth lenses; and including
a centering mechanism for centering at least one of said first, second, fifth, sixth, ninth and tenth lenses with reference to the optical axis of said projection objective.

11. A projection objective as set forth in claim 10, wherein: said centering mechanism commonly centers two adjacent ones of said lenses.

12. A projection objective as set forth in claim 11, wherein: said centering mechanism has at least three radially directed threaded pins screwed into threaded bores of said associated one of said objective housings.

13. A projection objective as set forth in claim 12, wherein: said threaded pins are arranged 120° from each other.

14. A projection objective as set forth in claim 13, wherein: said adjacent ones of said lenses retained in said centering mechanism are retained in the region of the lens surfaces that face each other by a two-sided conical mounting ring on which said centering mechanism acts.

15. A projection objective as set forth in claim 14, including:
a fixing mechanism fixing at least one of said lenses in the direction of the optical axis, having one of a stop, a spacer or a ring that can be screwed into the associated one of said objective housings.

16. A projection objective as set forth in claim 1, wherein: one of said first and second optical subassemblies has four lenses, and the other of said first and second optical subassemblies has five lenses.

17. A projection objective as set forth in claim 1, including: an enlargement side which includes said first optical subassembly mounted therein.

18. A projection objective as set forth in claim 1, including:
a reduced side which includes said second optical subassembly mounted therein.

19. A projection objective as set forth in claim 1, including:
a first, negative lens;
a second, negative lens;
a third lens;
a fourth, positive lens;
a fifth lens;
a sixth, positive lens;
a seventh, negative lens;
an eighth, positive lens; and
a ninth, positive lens.

20. A projection objective as set forth in claim 19, including:
a stop positioned between said fourth lens and said fifth lens.

21. A projection objective as set forth in claim 19, wherein:
said seventh lens and said eighth lens are cemented together.

22. A projection objective as set forth in claim 19, including:
a centering mechanism for centering at least one of said first, second, fifth, sixth, ninth and tenth lenses with reference to the optical axis of said projection objective.

23. A projection objective as set forth in claim 22, wherein:
said centering mechanism commonly centers two adjacent ones of said lenses.

24. A projection objective as set forth in claim 23, wherein:
said adjacent ones of said lenses retained in said centering mechanism are retained in the region of the lens surfaces that face each other by a two-sided conical mounting ring on which said centering mechanism acts.

25. A projection objective as set forth in claim 22, wherein:
said centering mechanism has at least three radially directed threaded pins screwed into threaded bores of said associated one of said objective housings.

26. A projection objective as set forth in claim 25, wherein:
said threaded pins are arranged 120° from each other.

27. A projection objective as set forth in claim 1, including:
a fixing mechanism fixing at least one of said lenses in the direction of the optical axis, having one of a stop, a spacer or a ring that can be screwed into the associated one of said objective housings.

28. A projection objective having a fixed focal length of digital projection, comprising:
a first optical subassembly having a plurality of lenses seated in a first objective housing;
a second optical subassembly lens seated in a second objective housing;
a third objective housing having said first objective housing received in one end thereof, and said second objective housing received in an opposite end thereof; and wherein
said projection objective has a maximum of nine lenses; and
one of said first and second optical subassemblies has four lenses, and the other of said first and second optical subassemblies has five lenses.

29. A projection objective having a fixed focal length for digital projection, comprising:
a first optical subassembly having a plurality of lenses seated in a first objective housing;
a second optical subassembly lens seated in a second objective housing;
a third objective housing having said first objective housing received in one end thereof, and said second objective housing received in an opposite end thereof;
a first, negative lens;
a second, negative lens;
a third lens;
a fourth, positive lens;
a fifth lens;
a sixth, positive lens;
a seventh, negative lens;
an eighth, positive lens; and
a ninth, positive lens.

* * * * *